July 29, 1969  J. E. HOOVER  3,458,126
DEVICE FOR COMPUTING AGATE LINES IN NEWSPAPER ADVERTISEMENTS
Filed Oct. 23, 1967  3 Sheets-Sheet 1

INVENTOR.
JAMES E. HOOVER
BY
MAHONEY, MILLER & RAMBO
BY
ATTORNEYS

July 29, 1969  J. E. HOOVER  3,458,126
DEVICE FOR COMPUTING AGATE LINES IN NEWSPAPER ADVERTISEMENTS
Filed Oct. 23, 1967  3 Sheets-Sheet 2
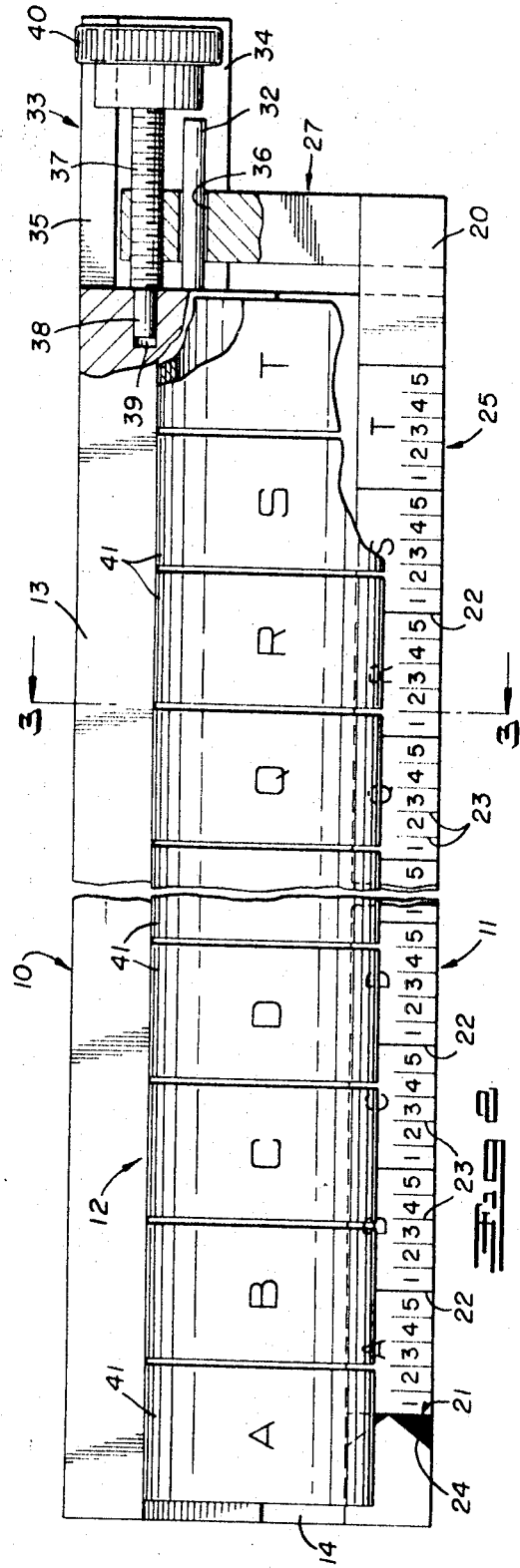
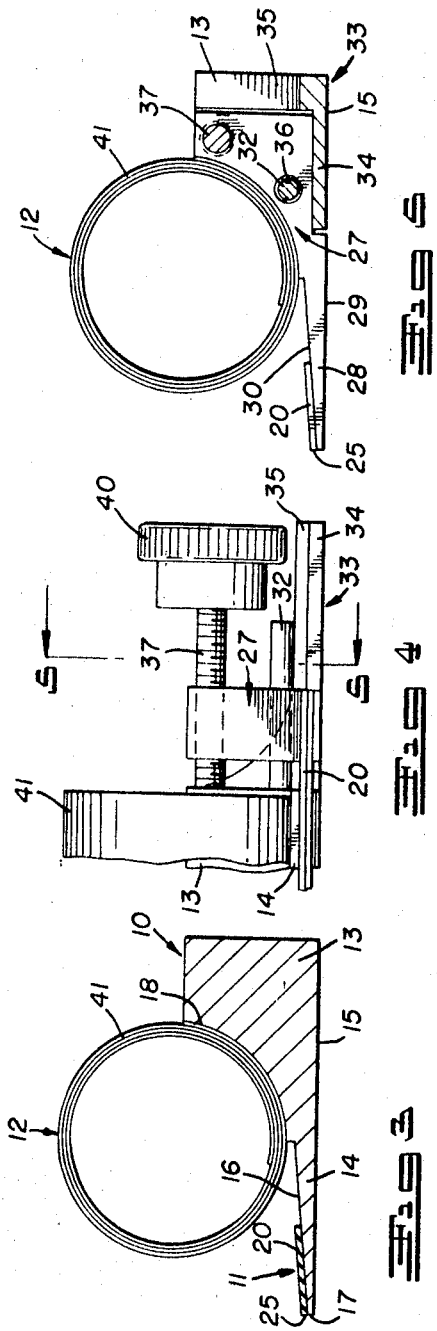
INVENTOR.
JAMES E. HOOVER
BY MAHONEY, MILLER & RAMBO
ATTORNEYS July 29, 1969 J. E. HOOVER 3,458,126
DEVICE FOR COMPUTING AGATE LINES IN NEWSPAPER ADVERTISEMENTS
Filed Oct. 23, 1967 3 Sheets-Sheet 3
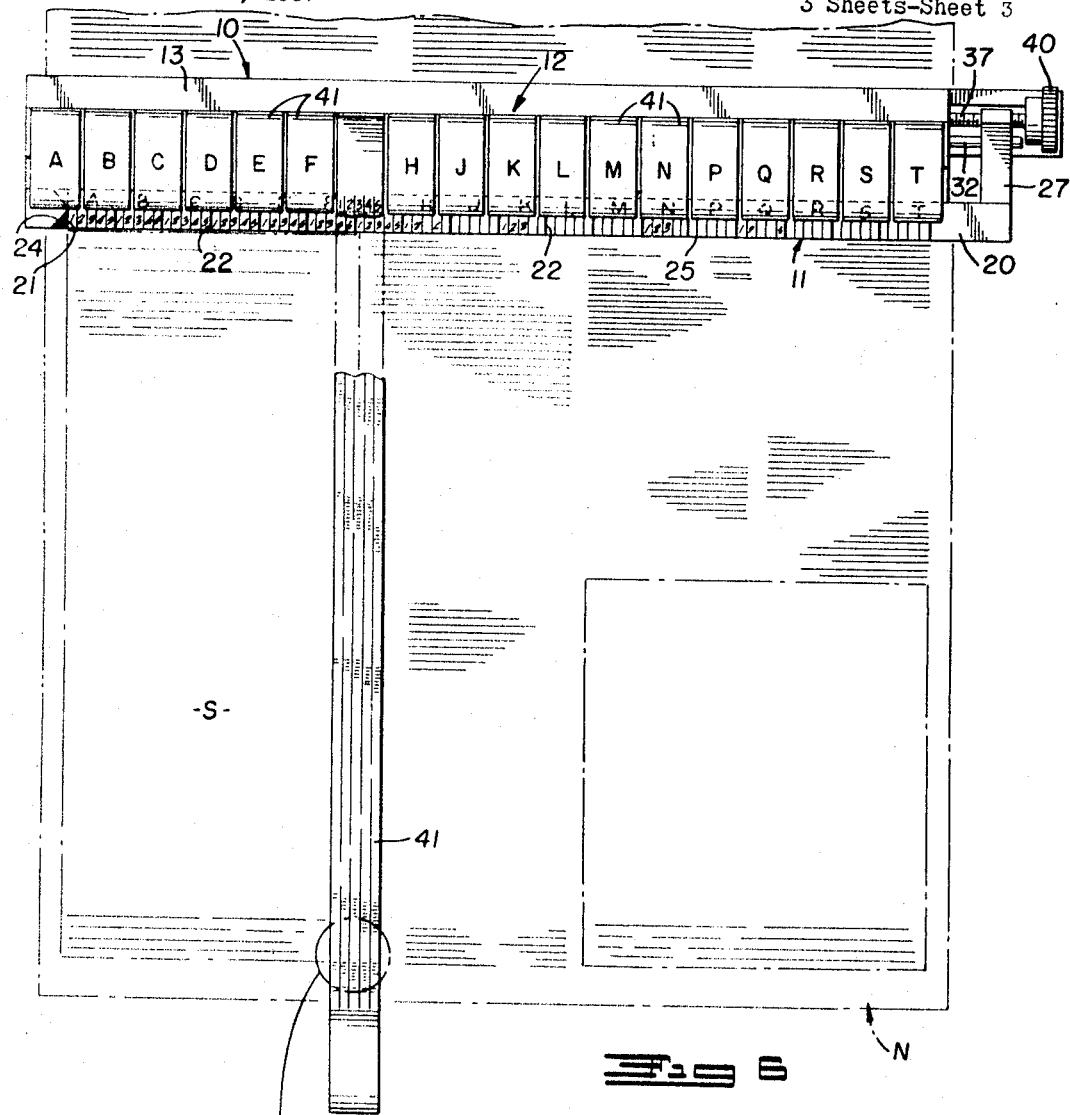
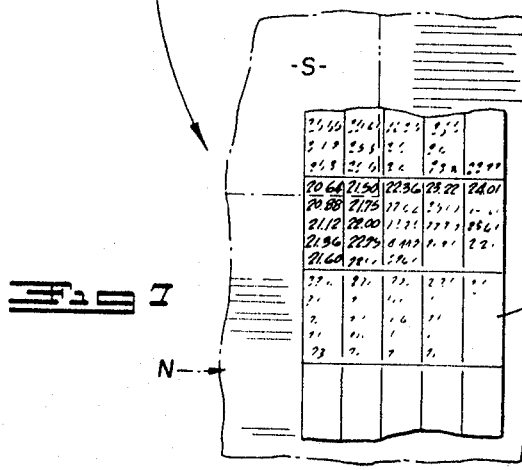
INVENTOR.
JAMES E. HOOVER
BY MAHONEY, MILLER & RAMBO
BY
ATTORNEYS

United States Patent Office 3,458,126
Patented July 29, 1969

3,458,126
DEVICE FOR COMPUTING AGATE LINES IN NEWSPAPER ADVERTISEMENTS
James E. Hoover, Worthington, Ohio, assignor to The Rahn Corporation, Worthington, Ohio, a corporation of Ohio
Filed Oct. 23, 1967, Ser. No. 677,408
Int. Cl. G06c 27/00
U.S. Cl. 235—71                     5 Claims

ABSTRACT OF THE DISCLOSURE

A manually operable computor device for indicating the number of agate lines in newspaper advertisements, and comprising a proportionately adjustable horizontal column-measuring scale in combination with a plurality of extensible and retractable vertical line-measuring scales having indicia correlated to agate lines, i.e. $1/14$ inch $\times$ number of columns.

Background of the invention

The present invention relates generally to measuring instruments, and more specifically to a manually operable device for measuring and indicating the total number of agate lines contained in newspaper advertisements of varying areas.

Newspaper advertising space is charged for or billed at a specified rate per agate line. An agate line is a standardized unit of measurement used in the newspaper advertising business and is equivalent to one column multiplied by the depth of one newsprint line. A newsprint line has a standard depth dimension of $1/14$ inch, but the width of a column may vary as between different newspapers. In addition to variations in column width as between different newspapers, there is a shrinkage in the newsprint during the printing operation which results in further variations in column width. Consequently, it is necessary to check the actual printed advertising space to determine the correct costs or charges for such space. Such space checking is made difficult because of the nonuniformity of column widths as between different newspapers and use of the customary lineal measuring devices, fixed unit scales, for example, produces inaccurate results and requires a considerable amount of time.

The primary object of this invention is to provide a mechanically simple, easily operable computor device or instrument which may be placed in registry with the upper boundary line of a newspaper advertisement and quickly adjusted so as to accurately indicate the total number of agate lines in the particular advertisement.

General description of the invention

The measuring instrument of this invention provides an accurate means for quickly measuring and indicating the total number of agate lines contained in a given advertising space regardless of whether such space contains an even number of columns or fractions of columns. The instrument includes an elastic or proportionately extensible scale member provided with graduations corresponding, for example, to tenths of a column and which maintain their proportional relationship throughout the range of elastic extension of the scale. Support means provided for the elastic scale permits selective extension or contraction of the scale to align major column graduation with the column limits of the actual newsprint and thus provides an accurate and convenient determination of column units or fractions thereof of any advertising space in the newsprint. The number of vertical lines in a given advertising space is determined by one of a plurality of flexible, roll-up type scales carried on the instrument, the appropriate roll-up scale being indicated by the indicia of the elastic scale opposite the right hand boundary of the particular advertising space to be measured. Each roll-up scale includes columnar indicia corresponding in vertical spacing to the standard vertical line measurements of the newsprint and factored to provide agate line totals which are multiples of the number of columns or fractions thereof times the number of lines.

The various objects and advantages of this invention will be more readily apparent from the following detailed description of a preferred embodiment of the invention and the accompanying drawings, wherein:

FIGURE 2 is a top plan view of the device.

FIGURE 3 is a vertical sectional view taken along line 3—3 of FIGURE 2.

FIGURE 4 is a fragmentary elevational view of the scale-adjusting mechanism of the computor device.

FIGURE 5 is a vertical sectional view taken along line 5—5 of FIGURE 4.

FIGURE 6 is a top plan view of the device showing how it is utilized in measuring an advertising space.

FIGURE 7 is an enlargement of the circled area of FIGURE 6.

Figure 1:
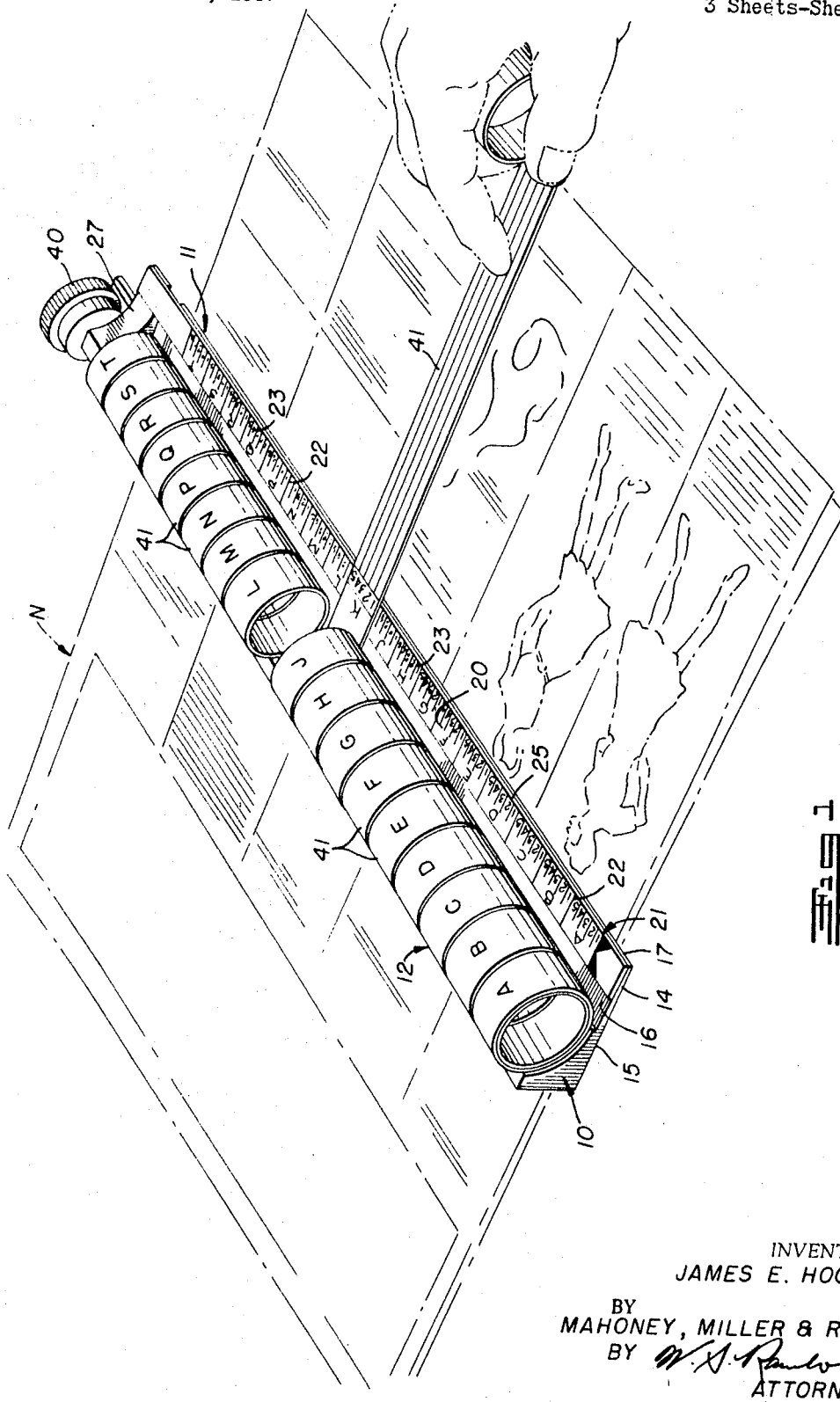
FIGURE 1 is a perspective view showing the present agate line computor device superposed on a newspaper advertisement.

Referring now to the drawings, an agate line computor device according to this invention is illustrated and comprises, in general, a base frame 10, column width-measuring means 11, and column depth-measuring means 12. The base frame 10 is of elongated, bar form and is fabricated from a rigid material having the necessary structural strength for supporting the measuring means in assembled relationship and may be of wood, metal or plastic. In a preferred embodiment, the apparatus is designed to permit measurement of a full-width newsprint, advertising space in a single operation and is of a length to extend the full-width of a newsprint page. Referring particularly to FIGURES 1-3, it will be seen that the base frame 10 comprises an elongated main body portion 13 and a relatively thinner longitudinally-extending lip or edge portion 14. The lip portion 14 projects laterally outwardly from the main body portion 13 with the lower surface of each being contiguous and forming a single, planar base-surface 15 for placement upon a newsprint page N. It will also be noted that the upper surface 16 of the lip portion 14 is inclined downwardly or tapered outwardly from the main body portion 13 so as to define a relatively thin, outer reference edge 17. The main body portion 13 of the base frame is also formed to include an arcuately concave surface 18 located above and inwardly of the lip portion 14. This concave surface 18 accommodates and provides a mounting surface for the several elements of the depth-measuring means 12, as will be hereinafter described.

The column width-measuring means 11 preferably takes the form of elastic tape 20 which extends longitudinally of the base frame 10 in immediately overlying relationship to the lip portion 14. The upper surface of the elastic tape 20 is printed or otherwise provided with uniformly spaced graduations. These graduations preferably include a "zero" or index line 21 and eighteen major graduation lines 22 which divide the tape scale into eighteen major divisions identified by alphabetical letters A, B, C, etc. Each of the major divisions A, B, C, etc. are subdivided by unit graduations 23 into five minor divisions identified by numerals 1–5. The marginal end portion of the tape 20, adjacent the reference index 21, is preferably surface-shaded, as at 24, to facilitate identification of the reference index.

The column-measuring tape 20 may be formed from any suitable, substantially permanently elastic material, such as natural latex rubber or a combination of woven textile fibers and latex rubber. The material for the tape 20 is such that it may be repeatedly stretched approximately 1½ times its normal, relaxed length without impairment of its elasticity. The length of the tape 20 is selected so that it will extend completely across the normally printed area of the smallest known newspaper page when under very slight elastic tension. The imprinting of the graduations on the tape 20 is preferably accomplished when the tape is stretched to approximately one-half of its limit of elasticity. Imprinting of the indicia at this stage of elastic elongation will thus assure maximum readability of the indicia within the normal range of elasticity of the tape 20. The spacing between the major graduations 22 is also preferably determined at this point of elongation of the tape 20, so that each major space A, B, C, etc. will correspond in length to one-half of the width of a newsprint column of average width. Thus, expansion or contraction of the tape will then permit the graduations to correspond to column widths which are greater or less than this assumed average width.

The width-measuring scale or tape 20 is arranged on the base frame 10 so as to permit free elastic elongation or contraction thereof within the desired operating limits of the computor device.

Toward this end, the end portion leftwardly of the index graduation 21 is adhesively bonded or otherwise permanently secured to the upper surface 16 of the lip portion 14 of the base frame. The opposite or righthand end portion of the tape 20, beyond the last graduation thereon, is likewise adhesively bonded or otherwise permanently secured to an adjustable, longitudinally movable carriage or slide 27. As can be best seen by reference to FIGURES 4 and 5, the slide 27 includes an elongated finger portion 28 which projects forwardly from the base frame 10 and is of the same general cross-sectional configuration as the lip portion 14 of the base frame 10. The finger portion 28 of the slide includes a bottom planar surface 29 which is co-planar with the surface 15 of the base frame 10 and also includes an upper surface 30 which is upwardly inclined. It is to this upper surface 30 that the tape 20 is adhesively bonded and thus maintained in co-planar relationship to the upper surface 16 of the lip portion 14. It will also be noted that the tape 20 is thus supported with its longitudinal edge 25 vertically aligned with the longitudinal edge 17 of the lip portion 14, as can be best seen in FIGURE 3. The relative thinness of the edge 17 will substantially minimize errors due to parallax in reading of the graduation of the scale on tape 20.

Guide means carried by the base frame 10 slidably supports the slide for limited longitudinal movement at the right hand end of the base frame 10. This guide means includes a guide pin 32 and a guide way 33 which project axially from the main body 13 of the base frame and cooperatively engage the slide 27. The guide way 33, which may be integrally formed with the base frame, comprises a horizontal plate portion 34 and a vertical rib portion 35. The upper surface of the horizontal plate portion provides a bearing surface for the adajacent lower surface of the slide 27. An aperture 36 formed in the slide 27 receives the cylindrical guide pin 32 which is secured in a socket formed in the end of the base frame. The bearing surfaces are sufficient to maintain the slide in proper alignment and to prevent binding during sliding movement.

Movement and positioning of the slide 27 at a selected point to obtain the desired elongation of the scale 20 is effected by a screw-threaded shaft 37 extending through a threaded aperutre formed in the slide. The shaft 37 is formed with a reduced diameter shaft-extension 38 which is rotatably retained in a bearing socket 39 formed in the main body 13 of the base frame. A knurled handwheel or knob 40 is formed at the opposite end of the shaft 37 to facilitate manual rotation of the shaft in selectively positioning the slide 27.

The column depth-measuring means 12 comprises a plurality of elongated scales 41 equal in number to the column-unit spaces A, B, C, etc. of the width-measuring tape 20. Accordingly, there are eighteen elongated scales of similar construction which are also alphabetically designated by the letters A, B, C, D, etc., with each scale 41 being related to a corresponding column-unit space of the tape 20. Each elongated scale 41 is formed from a thin strip of resiliently flexible material and is preferably of a roll-up type normally disposed in a spirally coiled configuration. This spirally coiled configuration has an outer arcuately curved surface which corresponds to the curvature of the concave surface 18 formed in the base frame 10. The outer end portion of each of the elongated scales 41 is rigidly secured to an adjacent area of the surface 18 of the base frame, as by adhesive bonding. These scales are arranged on the base frame in such a manner that when uncoiled, the scales will project transversely from the base frame in substantially perpendicular relationship to the width-measuring tape 20, as shown in FIGURES 1 and 6. Thus, the scales 41 will provide a measurement of the depth of an advertising space and the upper exposed surface of each of the scales is provided with suitable rows of indicia indicating the number of agate lines relative to a given column-depth measurement. A standard line for newsprint is $\frac{1}{14}$ of an inch and the indicia in each row are accordingly spaced $\frac{1}{14}$ of an inch apart along the scales. The indicia bearing portion of each scale is approximately 24 inches long to enable the instrument to be utilized in determining advertising space which extends substantially the full length of a newspaper page.

Each scale 41 is also provided with five vertical rows or columns of agate line-indicating indicia with each of the columns being identifiable with a minor graduation or sub-unit space of the column width-measuring tape 20 by means of the numerals 1 through 5 printed on each of the scales 41 at the top of the columns. This agate line-indicating indicia, as can be best seen with reference to FIGURE 7, is arranged in columns on each of the scales 41 such that for an advertisement of given column width and column depth, the indicia will directly indicate the total agate lines included in the advertising space. This can be clearly seen by reference to FIGURES 6 and 7 where an assumed advertising space S of a newsprint page N is seen to have a column width extending from the reference index 21 to the sub-unit space 1 of the major column unit space G of the width-measuring tape 20. The depth of the advertisement is then determined by the scale 41 marked with the letter G. As will be seen in FIGURE 7, the bottom boundary line of the advertisement S intersects the G scale at a point which underlines the series of numbers extending in a horizontal row and beginning wtih the number 20.64. Thus, since the width of the advertising space S is indicated on the tape 20 as "G1," the total number of agate lines contained in the advertisement space S will be read in the first vertical column of the G scale 41 where the bottom boundary line of the space intersects the G scale, providing an answer of 20.64 agate lines.

In utilization of the measuring instrument of this invention, it is first necessary to adjust the column width-measuring scale or tape 20 to bring it into correspondence with the actual column width of the particular newsprint page. This may be easily accomplished by placing the instrument transversely across the newspaper page with the "zero" or index line 21 of the tape 20 aligned with the left-hand boundary line of the page and then turning the hand-wheel or knob 40 to adjust the elongation of the tape 20 to bring the major graduations 22 into correspondence with the actual number of columns contained on the newspaper page. For example, if a particular newspaper uses pages of seven column width, then the tape 20 is adjusted so as to align the fourteenth major graduation 22 with the right-hand boundary line of the printed matter on the page. Similarly, if the particular newspaper uses pages of nine column width, then the tape 20 would be adjusted to bring the eighteenth major graduation 22 into alignment with the right-hand boundary line of the printed matter on the page. Also, should the particular newspaper page contain printed columns whose actual widths are delineated by right- and left-hand boundary lines, then the instrument may be easily "set" by placing the index line 21 on the left-hand boundary line of any selected columns and then turning the knob 40 so as to align the second major graduation 22 of the tape 20 with the right-hand boundary line of that column.

This procedure adjusts the instrument to a specific newspaper column format, and will thus enable measurement of advertising space in terms of agate lines irrespective of actual lineal measurements. Once the column width-measuring tape 20 has been set in accordance with this procedure, the instrument is placed on the selected newspaper page with the edge 17 of the base frame aligned with the upper boundary of the advertising space to be measured and with the index line 21 placed at the left-hand boundary line of the advertising space. The point of intersection of the right-hand boundary line of the advertising space with the width-measuring tape 20 is then observed, so as to determine the particular scale 41 to be uncoiled and the particular column number of the scale 41 to be read. In the illustrated example of FIGURE 6, the point of intersection is seen to be sub-unit space 1 of major unit space G of the tape 20. The scale 41, identified by the letter G, will then be uncoiled to determine the depth of the particular advertising space. The point of intersection of the lower edge or boundary line of the advertising space with the uncoiled scale 41 will be noted and the total number of agate lines in the advertising space may then be read in the "number 1" column of the uncoiled scale at or adjacent this point of intersection.

It will thus be apparent from the foregoing description, that this invention provides a structurally simple, easily operable computor device for measuring or calculating the number of agate lines contained in a given newspaper advertisement, regardless of whether the advertisement covers whole or fractional portions of column widths. The present computor device is further characterized by its versatility of use in measuring advertisement spaces contained in various newspapers having different numbers and widths of columns in their page layouts or formats.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A computor device for indicating the number of agate lines contained in a newsprint space, comprising: a base frame adapted to be placed flatly upon and transversely of a newsprint page; a first, longitudinally extensible scale means carried by said base frame and having proportionately spaced indicia thereon correlated to the number of columns of a newsprint page; manually operable means connected between said base frame and said first scale means for adjusting the longitudinal dimension of said scale means in accordance with the column width of a newsprint page; and a second scale means carried by said base frame for transverse extension therefrom and having proportionately spaced indicia thereon correlated to multiples of numbers of columns times number of lines of a newsprint space.

2. A computor device according to claim 1, wherein said second scale means is provided with identification symbols corresponding to the indicia of said first scale means.

3. A computor device according to claim 1, wherein said first scale means comprises an elastic tape.

4. A computor device according to claim 2, wherein said second scale means comprises a plurality of normally coiled graduated scales arranged to be selectively uncoiled and extended transversely outwardly from said base frame.

5. A computor device according to claim 1, wherein said first scale means comprises an elastic, proportionately graduated tape, and said second scale means comprises a plurality of normally coiled, graduated scales having identification symbols corresponding to the graduation indicia of said elastic tape.

References Cited

UNITED STATES PATENTS

| | | | |
|---|---|---|---|
| 277,292 | 5/1883 | Knight | 235—89 |
| 975,689 | 11/1910 | Greenwood | 33—111 |
| 2,156,524 | 5/1939 | Christensen | 33—107 |
| 3,213,544 | 10/1965 | Adler | 33—158 |
| 3,391,864 | 7/1968 | Adler | 235—71 |

STEPHEN J. TOMSKY, Primary Examiner

U.S. Cl. X.R.

235—61, 86